United States Patent
Wright et al.

(10) Patent No.: US 9,050,692 B2
(45) Date of Patent: Jun. 9, 2015

(54) METHOD AND APPARATUS FOR RADOME AND REFLECTOR DISH INTERCONNECTION

(75) Inventors: Alastair D Wright, Edinburgh (GB); Ian Renilson, Fife (GB); John Curran, Kirkcaldy (GB); Matthew R Lewry, Fife (GB)

(73) Assignee: CommScope Technologies LLC, Hickory, NC (US)

( * ) Notice: Subject to any disclaimer, the term of this patent is extended or adjusted under 35 U.S.C. 154(b) by 571 days.

(21) Appl. No.: 13/279,415

(22) Filed: Oct. 24, 2011

(65) Prior Publication Data

US 2013/0099991 A1 Apr. 25, 2013

(51) Int. Cl.
| | |
|---|---|
| *H01Q 19/12* | (2006.01) |
| *B23P 11/00* | (2006.01) |
| *H01Q 1/12* | (2006.01) |
| *H01Q 1/42* | (2006.01) |

(52) U.S. Cl.
CPC .......... *B23P 11/005* (2013.01); *Y10T 29/49908* (2015.01); *H01Q 19/12* (2013.01); *H01Q 1/12* (2013.01); *H01Q 1/42* (2013.01)

(58) Field of Classification Search
USPC ......................................... 343/872, 775, 840
See application file for complete search history.

(56) References Cited

U.S. PATENT DOCUMENTS

| | | |
|---|---|---|
| 2,703,159 A | 3/1955 | Van Fleet |
| 2,717,667 A | 9/1955 | Bancroft |
| 2,989,788 A | 6/1961 | Kessler |
| 3,321,885 A | 5/1967 | Pratt |
| 3,351,947 A * | 11/1967 | Hart ............................... 343/840 |
| 3,606,419 A | 9/1971 | Virkler et al. |
| 3,687,512 A | 8/1972 | Alston |
| 3,782,054 A | 1/1974 | Goss, Jr. |
| 3,784,043 A | 1/1974 | Presnick |
| 3,786,612 A | 1/1974 | Baker |
| 3,866,380 A | 2/1975 | Benson |
| 3,973,371 A | 8/1976 | Heller |
| 4,042,288 A | 8/1977 | Litchfield |
| 4,090,799 A | 5/1978 | Crotti et al. |
| 4,099,815 A | 7/1978 | Cox et al. |
| 4,136,496 A | 1/1979 | Molyneux |
| 4,348,127 A | 9/1982 | Hays, Jr. |
| 4,368,584 A | 1/1983 | Logan |
| 4,453,855 A | 6/1984 | Richter |

(Continued)

OTHER PUBLICATIONS

Jeong Seok Kim, International Search Report of Counterpart International Application No. PCT/IB2012/054527, Mar. 11. 2013, Daejeon Metropolitan City, Korea.

*Primary Examiner* — Hoang V Nguyen
*Assistant Examiner* — Hai Tran
(74) *Attorney, Agent, or Firm* — Babcock IP, PLLC

(57) ABSTRACT

An interconnection retaining a radome upon a periphery of a reflector dish has a plurality of curved channel portions, each of the channel portions provided with an open periphery slot and an open retention slot. The periphery slot dimensioned to receive the peripheries of the radome and reflector dish. The channel portions are arranged end-to-end adjacent to one another, encircling the peripheries of the radome and reflector dish seated within the periphery slot. A gap may be provided between one or more of the channel portions. A link member is seated within the retention slot at an end of each adjacent channel portion. The retention slot at the end of each of the adjacent channel portions is crimped upon the link member. The link member may be, for example, a portion of threaded rod or a molded portion of polymer material.

8 Claims, 7 Drawing Sheets

(56) References Cited

U.S. PATENT DOCUMENTS

| | | |
|---|---|---|
| 4,477,990 A | 10/1984 | Buchanan |
| 4,570,406 A | 2/1986 | DiFazio |
| 4,662,092 A | 5/1987 | Kim |
| 4,856,230 A | 8/1989 | Slocomb |
| 4,918,459 A | 4/1990 | De Teso |
| 4,930,284 A * | 6/1990 | Falco .............................. 52/704 |
| 4,987,709 A | 1/1991 | Bucci |
| 5,079,860 A | 1/1992 | Nugent |
| 5,907,310 A | 5/1999 | Seewig et al. |
| 6,137,449 A | 10/2000 | Kildal |
| 6,522,305 B2 | 2/2003 | Sharman |
| 7,042,407 B2 | 5/2006 | Syed et al. |
| 8,259,028 B2 * | 9/2012 | Hills et al. .................... 343/872 |
| 2002/0063101 A1 * | 5/2002 | Thomas .................... 211/85.18 |
| 2004/0222933 A1 | 11/2004 | Desargant et al. |
| 2010/0315307 A1 | 12/2010 | Syed et al. |
| 2011/0140983 A1 | 6/2011 | Hills et al. |
| 2011/0267255 A1 | 11/2011 | Locatori |

* cited by examiner

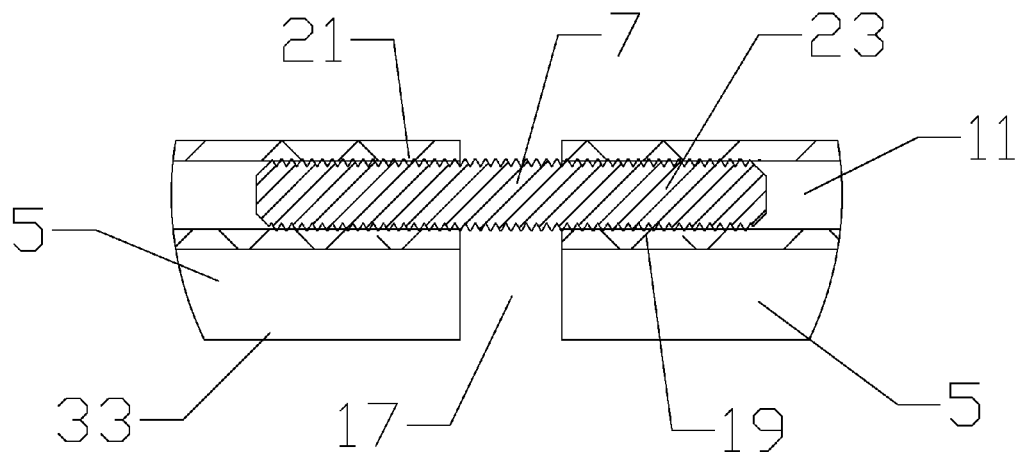
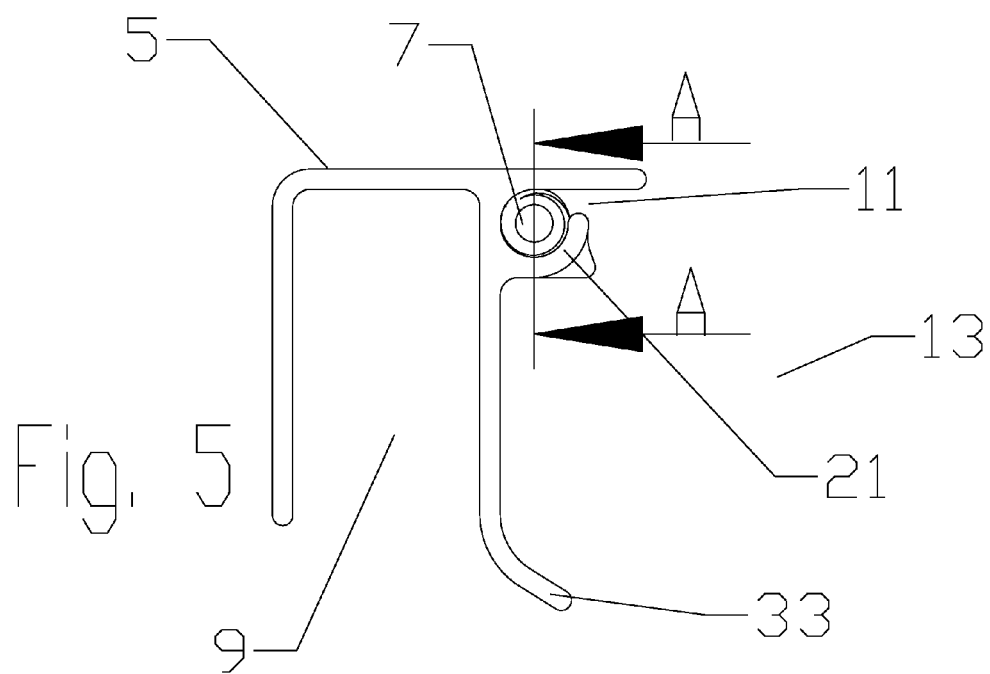

METHOD AND APPARATUS FOR RADOME AND REFLECTOR DISH INTERCONNECTION

BACKGROUND

1. Field of the Invention

This invention relates to microwave reflector antennas. More particularly, the invention relates to a cost-efficient radome bandclamp-type interconnection for retaining a radome upon the periphery of the reflector dish of a microwave reflector antenna.

2. Description of Related Art

The open end of a reflector antenna is typically enclosed by a radome coupled to the distal end (the open end) of the reflector dish. The radome provides environmental protection and improves wind load characteristics of the antenna. Because reflector antennas are often mounted in remote locations, such as high atop radio towers, a radome failure may incur significant repair/replacement expense.

A band clamp may be applied to retain the radome upon the reflector dish periphery via a removable closure means, such as a nut and bolt. However, nut and bolt closures may loosen with time, increase the total number of discrete components and/or require additional threading/tightening assembly steps. Alternatively, the radome may be retained via an integral connection means of the radome and reflector dish periphery, such as a plurality of tabs that mate with corresponding slots or the like. However, the radome and reflector dish must be each manufactured with the specific connection means applied to both elements, limiting interchangeability and/or replacement. Competition in the reflector antenna market has focused attention on improving electrical performance and minimization of overall manufacturing, inventory, distribution, installation and maintenance costs. Therefore, it is an object of the invention to provide a band clamp interconnection that overcomes deficiencies in the prior art.

BRIEF DESCRIPTION OF THE DRAWINGS

The accompanying drawings, which are incorporated in and constitute a part of this specification, illustrate embodiments of the invention, where like reference numbers in the drawing figures refer to the same feature or element and may not be described in detail for every drawing figure in which they appear and, together with a general description of the invention given above, and the detailed description of the embodiments given below, serve to explain the principles of the invention.

FIG. 4 is a schematic cross section close-up view of the interconnection, taken along line A-A of FIG. 5.

FIG. 5 is a schematic cross section view looking into the end of one of the channel sections of FIG. 3.

DETAILED DESCRIPTION

Figure 1:
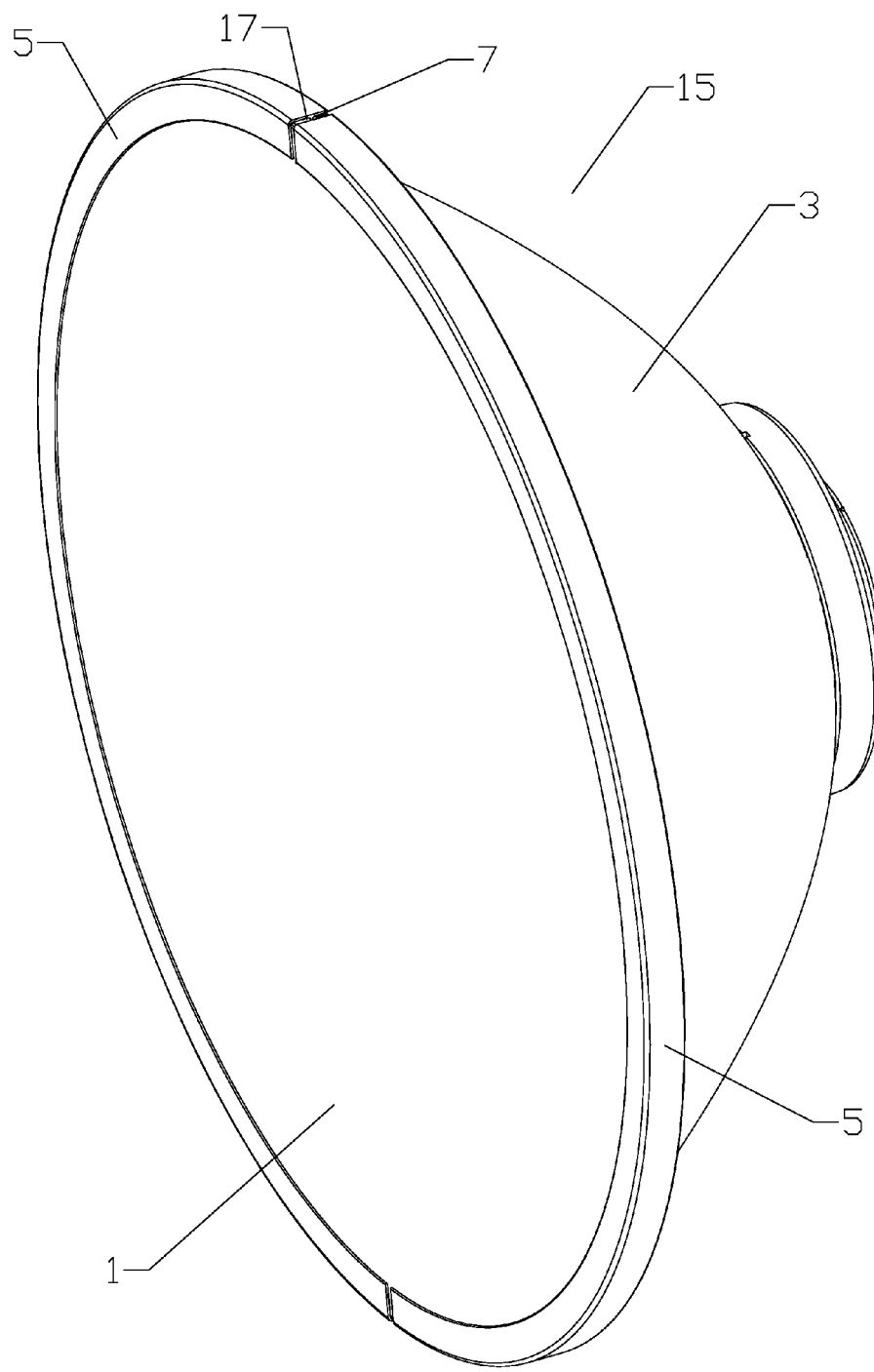
FIG. 1 is a schematic isometric angled front view of an exemplary radome to reflector dish interconnection.
Figure 2:
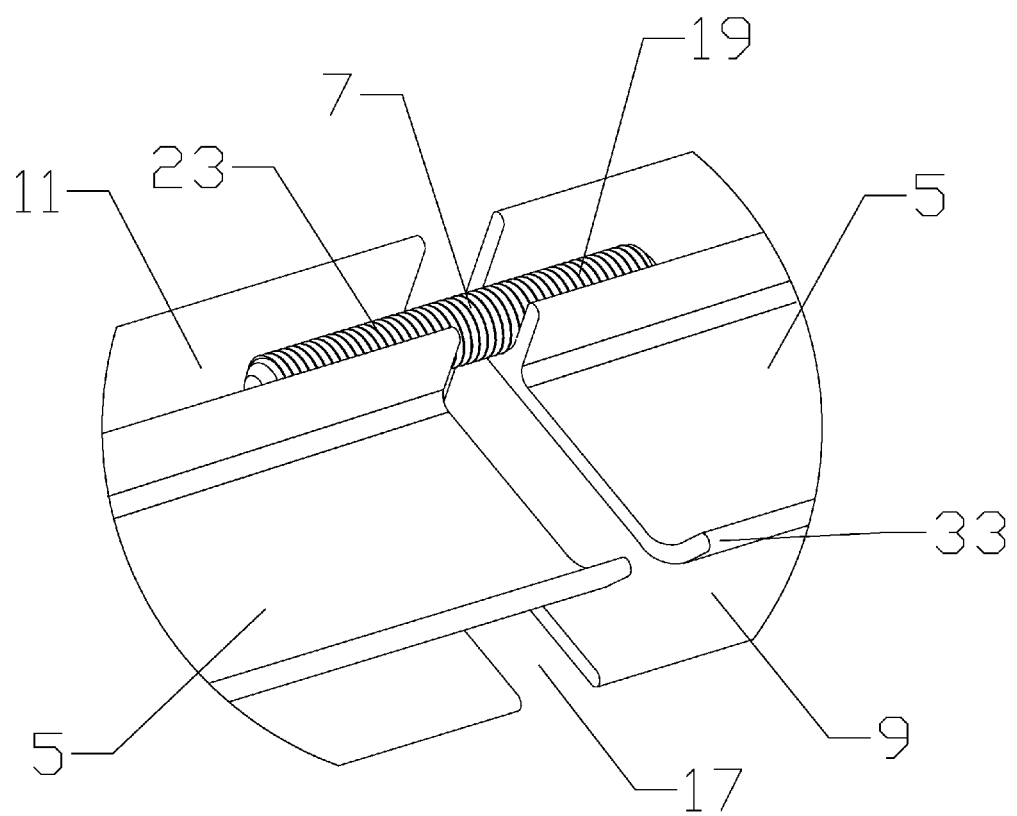
FIG. 2 is a schematic close-up isometric back view of the channel portion ends and link member of FIG. 1, prior to application of a crimp, radome and reflector dish removed for clarity.

A radome 1 is retained on reflector dish 3 via a permanent band clamp type interconnection that may be cost efficiently formed by crimping a plurality of curved channel portions 5 end to end around a shared link member 7, for example as shown in FIG. 1. Thereby, a reliable permanent interconnection may be cost efficiently formed from a minimum number of simplified parts, which may enable significant materials, manufacturing and/or installation efficiencies.

As best shown in FIGS. 2-5, the channel portions 5 are provided with an open periphery slot 9 and an open retention slot 11. The periphery slot 9 is dimensioned to receive the periphery of the radome 1 and the periphery of the reflector dish 3 seated upon one another. The channel portions 5 are arranged end-to-end adjacent to one another, encircling the periphery of the radome 1 and the periphery of the reflector dish 3 seated within the periphery slot 9. A gap 17 may be provided between each channel portions 5 are arranged end-to-end adjacent to one another.

Figure 7:
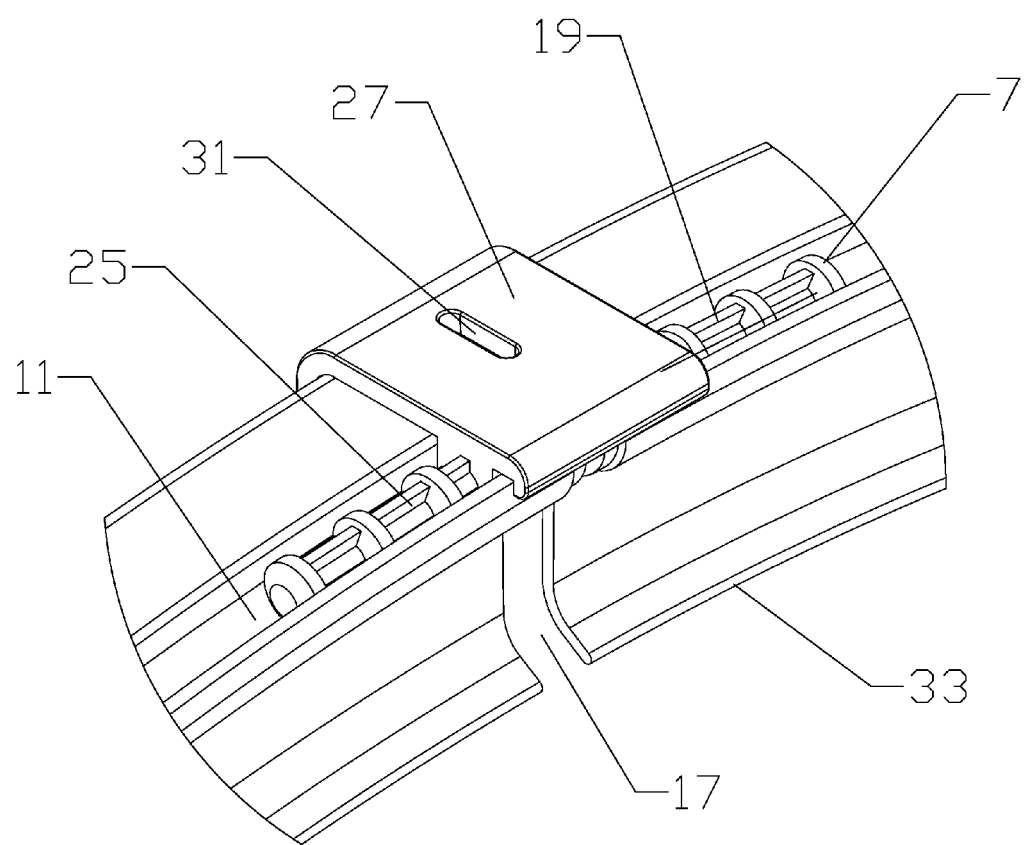
FIG. 7 is a schematic isometric view of the link member of FIG. 6, installed upon the ends of channel portions, prior to crimping.
Figure 8:
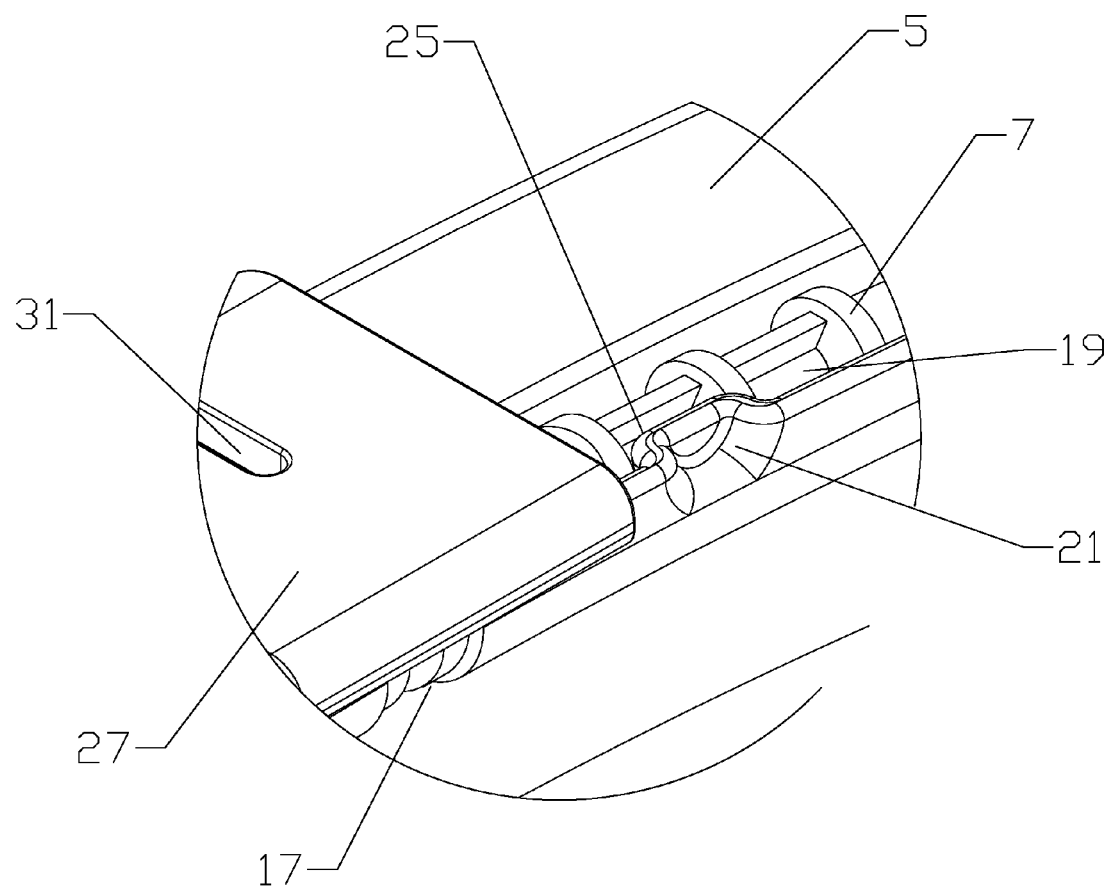
FIG. 8 is a schematic isometric close-up view of the link member and channel portions of FIG. 7, after crimping.

The retention slot 11 may be oriented normal to the periphery slot and on a back side 13 of the channel portions 5. That is, the generally U-shaped periphery and retention slots 9, 11 are each open to a direction generally 90 degrees from the other. Thereby the retention slot 11 may be easily accessed for crimping but the retention slot 11 remains generally out of view from the front of the assembled reflector antenna 15. Alternatively, the retention slot 11 may be oriented 180 degrees from the periphery slot 9, that is, on outer diameters of the channel portions 5, for example as shown in FIGS. 7 and 8. Thereby, the retention slot 11 may operate as an additional choke for any surface currents that may spill over from the RF signals present in the reflector antenna 15 during operation, thus improving a signal pattern of the reflector antenna 15.

One skilled in the art will appreciate that where the periphery and retention slots 9, 11 are uniform along the length of the channel portions, as best shown in FIG. 5, the channel portions 5 may be cost efficiently manufactured, for example, by extrusion of metal such as aluminum and/or aluminum alloy.

The plurality of channel portions 5 is demonstrated here as two channel portions 5 interconnected via two link members. However, one skilled in the art will appreciate that the number of channel portions 5 may be increased by adding additional link members 7 between each of the additional adjacent channel portions 5 as they encircle the periphery of the radome 1 and reflector dish 3. Use of additional channel portions 5 may provide, for example, simplified channel portion manufacture and/or in-process part storage/transport.

Figure 3:
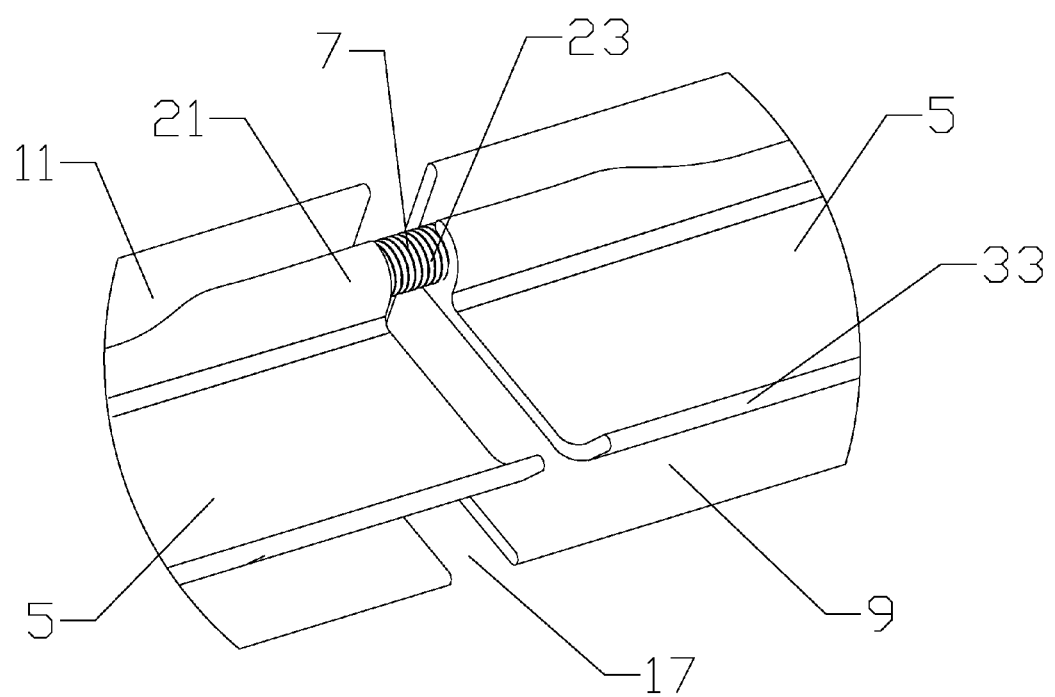
FIG. 3 is a schematic isometric view of FIG. 2, after application of the crimp.

To form each end to end channel portion interconnection, a link member 7 is seated within the retention slot 11 at an end of each adjacent channel portion 5 and the retention slot 11 is crimped upon the link member 7, for example as shown on FIGS. 3, 5 and 8. The gap 17 may be left between the channel portions 5 to facilitate draining of moisture from the periphery and/or retention channels 9, 11 and/or accommodate dimensional variances of the radome 1, reflector dish 5 and/or channel portions 5 during manufacture and/or assembly. To improve a grip of the crimped retention slot sidewalls upon the link member 7, the link member 7 may be provided with at least one retention trough 19. One skilled in the art will appreciate that the retention trough 19 may be formed as any aperture and/or protrusion of the link member 7 which the sidewalls of the retention slot 11 can deform into/upon and/or which will cut into and grip the retention slot 11 sidewalls during the application of the crimp 21. The retention trough 11 may be formed, for example, as a helical thread 23 along the outer diameter of the link member 7, such as available on a metal threaded rod. To cost efficiently form link members 7 of this type, bulk lengths of threaded rod may be cut into short portions.

Figure 6:
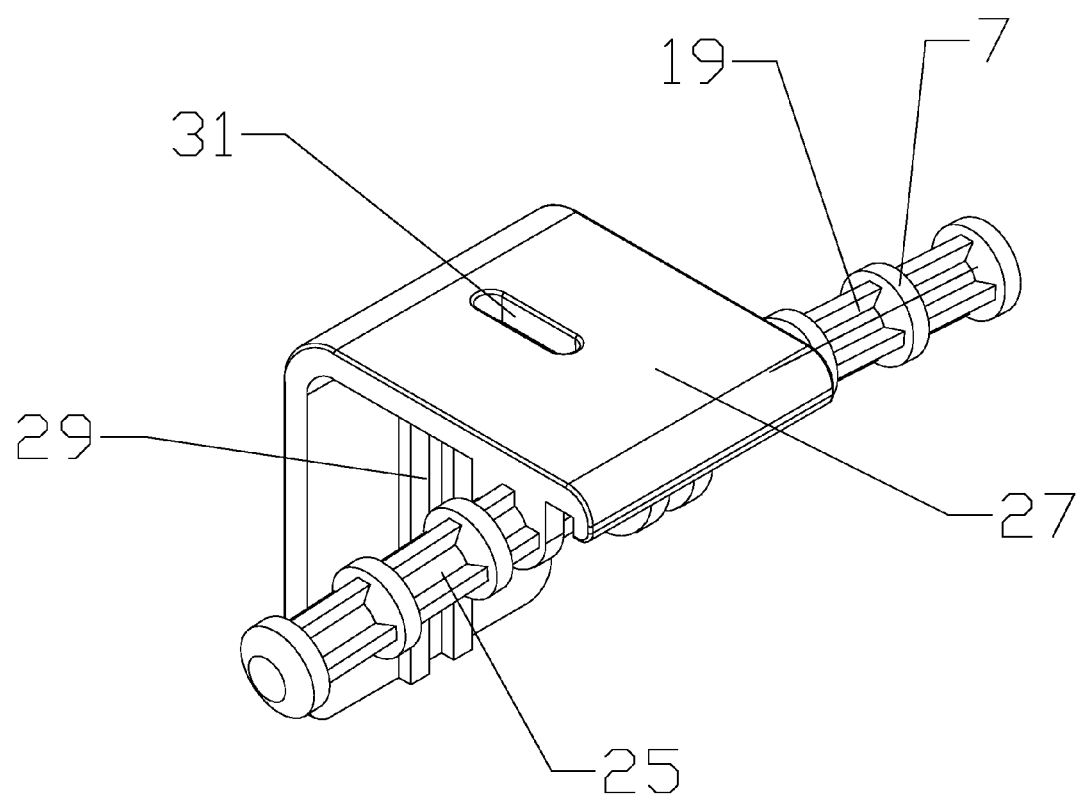
FIG. 6 is a schematic isometric view of an alternative embodiment link member.

Alternatively, as shown for example in FIGS. 6-8, the retention troughs 19 may be formed as a depression 25 or other cavity, for example by injection molding the link member 7 from a polymer material. Link member fabrication by injection molding may also enable the cost efficient addition of further features to the link member 7. For example, the link member 7 may be formed with a gap cover 27 extending along a portion of an outer diameter of the adjacent channel portions 5, covering the gap 17 there between. As best shown in FIG. 6, the gap cover 27 may also extend to cover a front side of the channel portion 5. The gap cover 27 may include a seat shoulder 29 that the ends of the adjacent channel portions 5 seat against prior to interconnection. The gap cover 27 may operate as an aid to aligning the channel portions 5 during initial assembly prior to crimping, as a protective cover for sharp edges of the channel portion 5 ends, as a cosmetic flair for the reflector antenna and/or to reduce chances for environmental fouling of the gap 17. Where moisture draining is a concern, the gap cover 27 may be formed with a weep hole 31 through the seat shoulder 29, as best shown in FIG. 7.

To assemble an interconnection for retaining a periphery of a radome 1 upon a periphery of a reflector dish 3, the channel portions 5 are seated upon the periphery of the radome 1 and the reflector dish 3, within the periphery slot 9. The channel portions 5 are arranged end-to-end adjacent to one another encircling the periphery (but for the desired gap 17) of the radome 1 and reflector dish 3. A link member 7 is seated within the retention slot at the ends of each adjacent channel portion 5 and the retention slot 11 is crimped proximate the end of each of the adjacent channel portions 5 upon the link member 7. One skilled in the art will appreciate that, by compressing the channel portions 5 radially inward upon the radome 1 and reflector dish 3 periphery prior to applying the crimp, the crimping will permanently apply a desired level of tension to the resulting interconnection; for example, it may bias a turnback region 33 of the periphery slot sidewall against the back side of the reflector dish 3 to reduce any RF leakage that may otherwise arise between these surfaces.

The crimp 21 applied may be along the extent of the link member 7, driving the retention slot 11 sidewalls against the selected retention trough 19 formed, for example as the helical thread 23 such that the helical thread 23 cuts into the sidewalls as shown in FIG. 4. Alternatively, the crimp 21 may be dimensioned to key within an enlarged retention trough 19, for example a depression 25 as shown in FIG. 8. Thereby, retention via the crimping may be realized on both metal materials which cut into the retention slot 11 sidewalls or with respect to polymer materials which would otherwise deform rather than cut the sidewalls.

Because the interconnection may be formed upon a longitudinally uniform cross-section of extruded material, without any secondary attachment of fittings, closures or other multi-element types of closures, the interconnection fabrication and installation has been simplified, which may reduce material, fabrication and installation costs. The interconnection has minimal external dimensions, resulting in a streamlined and uniform interconnection with minimal surface irregularities. The gap 17 accommodates dimensional and/or tolerance variations that remove prior requirements for accurate placement of components during assembly and/or multiple alignment features with corresponding high tolerance manufacturing of the individual assembly components. Finally, the interconnection enables cost effective use of aluminum material as the band in close contact with, for example, an aluminum material reflector dish, reducing the need to address dissimilar metal and/or galvanic corrosion concerns along the mating surfaces and/or the prior practice of utilizing a more expensive material for the band such as stainless steel.

| Table of Parts | |
|---|---|
| 1 | radome |
| 3 | reflector dish |
| 5 | channel portion |
| 7 | link member |
| 9 | periphery slot |
| 11 | retention slot |
| 13 | back side |
| 15 | reflector antenna |
| 17 | gap |
| 19 | retention trough |
| 21 | crimp |
| 23 | helical thread |
| 25 | depression |
| 27 | gap cover |
| 29 | seat shoulder |
| 31 | weep hole |
| 33 | turnback |

Where in the foregoing description reference has been made to materials, ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

We claim:

1. A method for retaining a periphery of a radome upon a periphery of a reflector dish, comprising the steps of:
   providing a plurality of curved channel portions, each of the channel portions provided with an open periphery slot and an open retention slot; the periphery slot dimensioned to receive the periphery of the radome and the periphery of the reflector dish;
   encircling the periphery of the radome and the periphery of the reflector dish seated within the periphery slot, the channel portions arranged end-to-end adjacent to one another;
   inserting a link member seated within the retention slot at an end of each adjacent channel portion; and
   crimping the retention slot at the end of each of the adjacent channel portions upon the link member.

2. The method of claim 1, wherein the retention slot is oriented normal to the periphery slot.

3. The method of claim 1, wherein a gap is provided between the channel portions arranged end-to-end adjacent to one another.

4. The method of claim 1, wherein the link member is provided with at least one retention trough.

5. The method of claim 4, wherein the at least one retention trough is formed as a helical thread along the outer diameter of the link member.

6. The method of claim 4, wherein the retention troughs are formed as annular slots.

7. The method of claim 1, further including the step of cutting the link member from a portion of threaded metal rod.

8. The method of claim 1, further including the step of injection molding the link member from polymer material.

* * * * *